(12) United States Patent
Crawford et al.

(10) Patent No.: US 7,706,007 B2
(45) Date of Patent: Apr. 27, 2010

(54) SYNCHRONIZATION IN A DISTRIBUTED SYSTEM

(75) Inventors: Lara S. Crawford, Mountain View, CA (US); Haitham A. Hindi, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1419 days.

(21) Appl. No.: 11/102,899

(22) Filed: Apr. 8, 2005

(65) Prior Publication Data
US 2006/0227350 A1    Oct. 12, 2006

(51) Int. Cl.
G06F 15/00 (2006.01)
G06F 3/12 (2006.01)
G06K 1/00 (2006.01)
(52) U.S. Cl. ...................... 358/1.15; 358/1.1
(58) Field of Classification Search ............... 358/1.15; 399/16, 18, 38, 46; 718/100; 700/213, 2, 700/9, 11, 14, 20, 44, 95
See application file for complete search history.

(56) References Cited

U.S. PATENT DOCUMENTS

| | | | |
|---|---|---|---|
| 4,310,878 A | | 1/1982 | Hyatt |
| 4,788,647 A | | 11/1988 | McManus et al. |
| 4,826,148 A | | 5/1989 | Coons, Jr. |
| 5,305,447 A | | 4/1994 | Hampshire |
| 5,363,175 A | * | 11/1994 | Matysek ...................... 399/77 |
| 5,448,735 A | | 9/1995 | Anderson et al. |
| 5,542,088 A | | 7/1996 | Jennings et al. |
| 5,636,124 A | | 6/1997 | Rischar et al. |
| 5,838,596 A | * | 11/1998 | Shimomura et al. ............ 703/6 |
| 5,870,545 A | | 2/1999 | Davis et al. |
| 6,116,157 A | | 9/2000 | Hayama et al. |
| 6,496,755 B2 | | 12/2002 | Wallach et al. |
| 6,496,848 B1 | * | 12/2002 | Nankaku ...................... 718/100 |
| 6,577,925 B1 | * | 6/2003 | Fromherz .................... 700/255 |
| 6,640,156 B1 | * | 10/2003 | Brooks et al. ................ 700/213 |
| 2002/0194269 A1 | * | 12/2002 | Owada et al. ................ 709/203 |
| 2003/0005180 A1 | | 1/2003 | Schmit et al. |
| 2004/0225391 A1 | * | 11/2004 | Fromherz et al. ............. 700/97 |
| 2004/0236691 A1 | | 11/2004 | Force et al. |
| 2005/0122339 A1 | | 6/2005 | Andrews et al. |
| 2006/0033771 A1 | * | 2/2006 | Lofthus ....................... 347/40 |
| 2006/0095672 A1 | | 5/2006 | Andrews et al. |
| 2006/0195842 A1 | * | 8/2006 | Williams ..................... 718/100 |
| 2006/0221362 A1 | | 10/2006 | Julien |

* cited by examiner

Primary Examiner—Douglas Q Tran
(74) Attorney, Agent, or Firm—Fay Sharpe LLP

(57) ABSTRACT

A method for synchronizing the control efforts of a plurality of controllers includes determining an apply time for using updated information. The apply time can take into account worst case processing and/or communication delays across a system. Reacting to the updated information only after at the apply time ensures that all system elements are able to react to the updated information in concert. A time stamp indicates when the data was collected. The apply time indicates when the data can be used. Process modeling or simulation is used to estimate system status at the apply time based on the system status at the time of the time stamp, the updated information, and predetermined information regarding the behavior of the system over time. In a document processor, the method allows tightly coupled modules, such as sheet transportation modules, to behave in a cooperative manner when separate modules are in contact with the same sheet.

28 Claims, 7 Drawing Sheets

SYNCHRONIZATION IN A DISTRIBUTED SYSTEM

CROSS REFERENCE

The following applications, the disclosures of each being totally incorporated herein by reference are mentioned: U.S. patent application Ser. No. 11/102,910, filed on Apr. 8, 2005, for Coordination in a Distributed System by Lara S. Crawford, et al. (20041210-US-NP, XERZ 2 00863); U.S. patent application Ser. No. 11/102,332, filed on Apr. 8, 2005, for On-The-Fly State Synchronization in a Distributed System by Haitham A. Hindi et al.(20041214-US-NP, XERZ 2 00865); and U.S. patent application Ser. No. 11/102,355, filed on Apr. 8, 2005, for Communication in a Distributed System by Markus P. J. Fromherz et al. (20041213-US-NP, XERZ 2 00864).

BACKGROUND

There is illustrated herein in embodiments, an architecture including methods and systems for synchronizing between elements in a distributed system. For example, a distributed system may include a collection of modules, each with its own function. The collection of modules may be interconnected to carry out a particular function or functions. The interconnection may be physical and/or logical in nature. Modules may be connected by a network or other communications scheme. Communications media may include wire, coaxial cable, fiber optics and/or radio frequency (RF) transmissions. The network or communications scheme may be associated with communication delays. Synchronizing controllers or processes in the face of such delays can be problematic. Some document processors are implemented as distributed systems and embodiments will be described with reference thereto. However, embodiments of the methods and systems described herein may be beneficially applied in a wide variety of control system environments.

Document processors include, for example, printers, copiers, facsimile machines, finishers and devices for creating documents, such as word processors and desk top publishers. In some instances, document processors provide the services of two or more of these devices. For instance, document processors that provide printing, copying, scanning, and faxing services are available. Printers and copiers can include feeders that supply print media and finishers that staple, shrink wrap or otherwise bind system output. Finishers may also fold or collate documents.

In order to increase throughput, some printers and copiers are being developed which include two or more marking engines. For example, U.S. patent application Ser. No. 10/924,113 filed Aug. 23, 2004 by Jonas M. M. deJong, et al. for a Printing System with Inverter Disposed for Media Velocity Buffering and Registration; U.S. patent application Ser. No. 10/924,106 filed Aug. 23, 2004 by Robert M. Lofthus, et al. for a Printing System with Horizontal Highway and Single Pass Duplex; U.S. patent application Ser. No. 10/924,459 filed Aug. 23, 2004 by Barry P. Mandel, et al. for a Parallel Printing Architecture Consisting of Containerized Image Marking Engine Modules; U.S. patent application Ser. No. 10/860,195 filed Jun. 6, 2004 by Robert M. Lofthus, et al. for a Universal Flexible Plural Printer to Plural Finisher Sheet Integration System; U.S. patent application Ser. No. 10/881,619 filed Jun. 30, 2004 by Daniel G. Bobrow for a Flexible Paper Path Using Multidirectional Path Modules; U.S. patent application Ser. No. 10/761,522 filed Jan. 21, 2004 by Barry P. Mandel, et al. for a High Print Rate Merging and Finishing System for Parallel Printing; U.S. patent application Ser. No. 10/785,211 filed Feb. 24, 2004 by Robert M. Lofthus, et al. for a Universal Flexible Plural Printer to Plural Finisher Sheet Integration System; and U.S. patent application Ser. No. 10/917,768 filed Aug. 13, 2004 by Robert M. Lofthus for a Parallel Printing Architecture Consisting of Containerized Image Marking Engines and Media Feeder Modules, all of which are incorporated herein by reference, describe aspects of tightly integrated document processing systems including a plurality of marking engines.

Additionally, some printers and copiers are being developed using a hypermodular structure to increase modularity and flexibility. These systems may possess a number of distributed processors, sensors, and actuators. For example, U.S. patent application Ser. No. 10/357,687 filed Feb. 4, 2003 by David K. Biegelsen, et al., for Media Path Modules; U.S. patent application Ser. No. 10/357,761 filed Feb. 4, 2003 by Markus P. J. Fromherz, et al., for Frameless Media Path Modules; U.S. patent application Ser. No. 10/740,705 filed Dec. 19, 2003 by David K. Biegelsen, et al., for a Flexible Director Paper Path Module; and U.S. patent application Ser. No. 10/812,376 filed Mar. 29, 2004 by David G. Duff, et al., for a Rotational Jam Clearance Apparatus, all of which are incorporated herein by reference, describe aspects of tightly integrated document processing systems including hypermodules.

Some systems, including some document processing systems, are based on a centralized control architecture wherein a single computational platform controls all system actuators and receives all system feedback information. These architectures work well where the systems are relatively small and are of a fixed or unchanging configuration. However, as system size increases, the computational capabilities of a single platform can be overwhelmed. Additionally, providing individual interfaces between the single computational platform and each of the sensors and actuators of the system can be impractical. Furthermore, where it is desirable to assemble or reconfigure a system from various subcomponents, the direct interfacing of sensors and actuators to the central platform becomes problematic.

These factors have led to the development of systems based on network communications. For example, U.S. Pat. No. 6,615,091 B1 to Birchenough, et al. for a Control System and Method Therefore allegedly disclosed an embodiment of a distributed control system including a main control coordinator, three local process station controllers and a designated number of process module controllers, each associated with a process module. The control system allegedly provides a real time operating system and has a communication bus platform provided via an Ethernet™ communication bus and a second bus to connect the controllers in a distributed control network. The Ethernet™ bus connects the main control coordinator and each of the local process station controllers and a continuous motion conveyer controller. Each of the process module controllers are connected via the second bus to designated local process station controllers.

In the system of Birchenough, the main controller agent interacts with each of the process station agents, and each of the process station agents interacts with each of the process module agents that are assigned thereto. During normal manufacturing operation, the main controller coordinator agent sends article notice messages to the process station agents to notify the process station agents of the oncoming articles of manufacture. A process station normally will not process the article of manufacture unless the process station agent that controls a particular process module has received an article notice message indicating that it should do so and the continuous feed indexer has returned a report that it is in proper position. In response, the process station agent notifies the designated process module agent to initiate its programmed process operation. Once the process module has completed its intended operation, the process module agent issues a work report message which is sent to the process station agent. The process station agent then broadcasts the work report message to other process stations as well as to the main control coordinator.

It appears that in the system of Birchenough, et al., a single entity (e.g., the main coordinator) is aware of and maintains information regarding each task, object or workpiece being processed by the system, and is thereby able to issue commands orchestrating the activities of system components. However, this may limit the scalability of the system. For example, as the size of the system increases, the capabilities and/or resources of the main control coordinator (or processor running the main control coordinator) may be overwhelmed. Therefore, it may be desirable to distribute some of this functionality over a number of processors or controllers.

However, as machines become more complex and contain larger numbers of embedded processors, instances of tightly coupled distributed control systems are becoming more common. In a tightly coupled system, controllers may interact through fast physical or informational coupling. That is, the actions of one controller may have an impact on an ability of a second controller to perform its function. Therefore, there is a desire for coordination and communication among the various controllers. One aspect of the coordination problem is how to synchronize a newly activated process or controller, which has been activated in order to address a particular portion of a process, to the status or state of the ongoing process in the face of communication delays.

United States Patent Application Publication Nos. U.S. 2001/0023377A1 and U.S. 2004/0111339A1 published Sep. 20, 2001 and Jun. 10, 2004, respectively, by Wehrung, et al. each entitled, "Distributed Control System Architecture and Method for a Material Transport System," both describe a hierarchical control system architecture for a material handling system. They discuss a midlevel controller that is configured to formulate commands in accordance with local goals formulated for the respective midlevel controller by a top level controller. U.S. Pat. No. 6,640,156 B1, issued Oct. 28, 2003 to Brooks, et al. entitled, "Sheet Handling System," allegedly describes a cut sheet processing system with a distributed control scheme and mentions a sheet tracking subsystem. However, these documents do not appear to discuss the coordination or synchronization of the use of feedback or updated process information.

United States Patent Application Publication No. U.S. 2002/0194269 A1, published Dec. 9, 2002 by Owada, et al. entitled "Distributed Process System, Distributed Processing Method and Client Terminal Capable of Using the Method," allegedly discloses a distributed processing system wherein a user terminal receives event information generated in other user terminals and transferred from a server. During a period that the event information is transmitted in a network, a model in a processing server becomes different from a model in the user terminal. Then, a state change compensation portion continuously changes a state model processed in a processing portion so that it becomes the same as the state of the model in the processing server, whereby an influence of delay generated by a communication can allegedly be reduced. The application appears to be directed toward compensating for network delays in a multi-player video game environment.

United States Patent Application Publication No. U.S. 2002/0178292 A1, published Nov. 28, 2002 by Mushkin, et al., entitled "Distributed Synchronization Mechanism for Shared Communications Media Based Networks," allegedly discloses a distributed synchronization mechanism in which a synchronization loop of each station on a shared media based network considers only synchronization signals received having a time phase earlier than the time phase of its internal clock. Therefore, the station with the fastest internal clock effectively functions as an ad hoc synchronization master for all stations in a given connected group.

However, the phase selecting technique of Mushkin is not applicable to the more complex synchronizations required in and between control processes. The video game synchronizing of Owanda is temporary in that synchronization is not necessarily maintained after an initial synchronization event.

Therefore, there is a desire for systems and methods for synchronizing processes to one another in the face of communications and/or processing delays.

BRIEF DESCRIPTION

A method for synchronizing control efforts of a plurality of controllers can include receiving updated process information in association with a time stamp indicating when the updated process information was collected, determining a maximum delay associated with distributing the updated process information to at least one of the plurality of controllers, determining, based on the determined maximum delay, an appropriate apply time at which the plurality of controllers are to react to the updated process information, and updating, at each controller of the plurality of controllers, a process model based on the updated process information and the determined apply time.

Additionally, the method can include producing a control signal, at each controller, based on the updated model, beginning after the determined apply time.

Determining the maximum delay can include determining a maximum network communications delay and/or delays associated with processing the updated process information.

Selecting the plurality of controllers can be based on the received updated process information or output of the process model or a second process model.

Updating the process model can be achieved by using forward propagation to simulate the process forward from the time indicated by the time stamp to the apply time.

A system that is operative to perform the method can include a plurality of controllers and a distributing element. For example, each controller of the plurality can be operative to control a portion of a task. The distributing element can be operative to receive updated process information, select controllers of the plurality to receive the updated process information, distribute the updated process information to the selected controllers in conjunction with at least one of a time stamp indicating when the information was collected and an apply time indicating when the information is to be used.

For example, the distributing element can be a coordinator that is operative to receive the updated process information from at least one of a controller and a sensor, transform the information to a form useful to each of the selected controllers, if necessary, and transmit the updated process information or the transformed information and the at least one of the time stamp and the apply time to the selected controllers. Alternatively, the distributing element can be a first controller that is operative to receive the updated process information from at least one of an estimator within the first controller and a sensor, transform the information to a form useful to each of the selected controllers, if necessary, and transmit the updated process information or the transformed information and the at least one of the time stamp and the apply time to the selected controllers.

The selected controllers can be operative to produce a control signal based on the updated process information beginning after the determined apply time.

The distributing element can be operative to distribute the process information by transmitting the updated process information, or a transformed version thereof, and the at least one of the determined apply time and the time stamp to the plurality of selected controllers over a system network.

The selected controllers can be operative to receive the updated process information, or a transformed version thereof, and the determined apply time and update a process model based on the received updated process information and the determined apply time. Alternatively, the selected controllers can be operative to receive the updated process information, or transformed version thereof, and the time stamp, determine a maximum delay associated with the distribution of the updated process information or transformed version, determine an appropriate apply time based on the maximum delay and update a process model based on the received updated process information and the determined apply time.

The distributing element can be operative to select the controllers from the plurality of controllers based on the received updated process information and/or output of a process model.

For example, the selected controllers can be operative to update a process model using forward propagation to simulate the process from the time indicated by the time stamp forward to an apply time, based on the updated process information, or a transformed version thereof, the time stamp and one of the distributed determined apply time or an apply time determined by the selected controllers, respectively.

A method for synchronizing control efforts of a plurality of module controllers in a document processing system can include receiving updated sheet processing information in association with a time stamp indicating when the updated process information was collected, determining a maximum delay associated with distributing the updated sheet processing information to at least one of the plurality of module controllers, determining, based on the determined maximum delay, an appropriate apply time at which the plurality of module controllers are to react to the updated document processing information, and updating, at each controller of the plurality of module controllers, a sheet process model based on the updated process information and the determined apply time.

For example, receiving updated sheet process information can include receiving at least one of sheet position, sheet velocity and sheet trajectory information from a first controller of the plurality or from a sensor.

A document processing system that is operative to perform the method can include a xerographic marking engine, a plurality of transport module controllers, each transport module controller of the plurality being operative to control a portion of a sheet transportation task related to transporting a sheet to or from the xerographic marking engine and a distributing element that is operative to receive updated process information, select transport module controllers of the plurality to receive the updated process information based on the received updated process information, and distribute the updated process information to the selected transport module controllers in conjunction with at least one of a time stamp indicating when the information was collected and an apply time indicating when the information is to be used.

The distributing element can be a sheet coordinator that is operative to receive the updated process information from at least one of a transport module controller and a sensor, transform the information to a form useful to each of the selected transportation module controllers, if desired, and transmit the updated process information or the transformed information and the at least one of the time stamp and the apply time to the selected controllers. Alternatively the distributing element can be a transport module controller that is operative to receive the updated process information from at least one of an estimator within the first controller and a sensor, transform the information to a form useful to each of the selected controllers, if necessary, and transmit the updated process information or the transformed information and the at least one of the time stamp and the apply time to the selected controllers.

Some embodiments also include at least a second marking engine. In those systems the sheet transportation task is further related to transporting the sheet to or from the at least a second marking engine.

DETAILED DESCRIPTION

Figure 1:
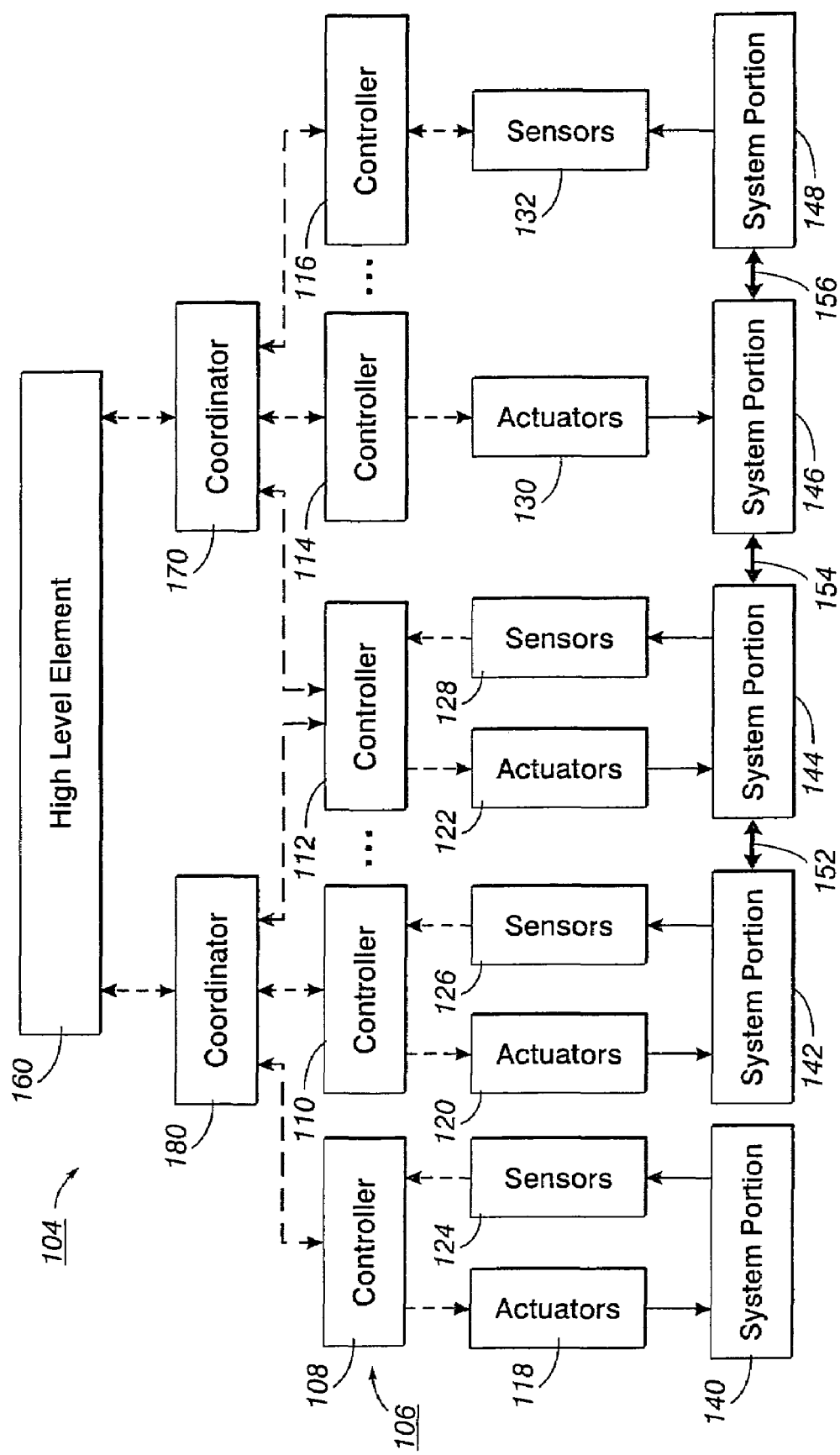
FIG. 1 is a block diagram of a system wherein second processes or controllers are synchronized to first processes or controllers.

Referring to FIG. 1, distributed systems (e.g., 104) often include a communications network for carrying communication between system elements (e.g., 108, 110, 112, 114, 116, 118, 120, 122, 124, 126, 128, 130, 132, 160, 170, 180). Communication in such networks is subject to communication delays. The delays can be significant when compared to system update periods, especially where systems are tightly coupled and system elements need to behave in a cooperative manner. In such systems, some mechanism is needed to ensure that the efforts of one controller or process are synchronized to the efforts of another system element or controller.

One method for ensuring cooperative control efforts is for each cooperating element to be constantly updated as to the activities of the other cooperating elements, and/or as to the status of progress of a task or workpiece. However, such methods require a great deal of inter-element communication, which may over-burden a system network or require the inclusion of a more expensive, higher bandwidth network. An alternative method for ensuring cooperative system element activities is to assign cooperative goals and constraints to relatively autonomous cooperating system elements, and synchronize the activities of the cooperating system elements to each other.

A goal describes a task to be performed. For example, a goal might be to move a workpiece from point A to point B, to move a workpiece at a specified speed or to deliver a workpiece to a particular location. Other examples of goals might include set points, such as a temperature set point, actuator operation, such as to open or close a valve or set a flipper to a first or second position, or to move an actuator at a particular speed.

A constraint is some description regarding how the goal is to be achieved. If goals and constraints are determined by some first or supervisory element that has knowledge regarding goals and constraints sent to the cooperating system elements, then cooperative activities can be ensured. For example, a constraint on the goal of moving a workpiece from point A to point B might be a deadline for delivering the workpiece to point B. By requiring that an element meet the deadline or constraint, the first or supervisory element can ensure that the workpiece is available at point B when a third element will be ready to receive it from point B. If point B will be occupied by another workpiece at a point in time prior to the deadline mentioned above, an additional or alternative constraint might be provided. For example, the constraint on the goal of moving the workpiece from point A to point B might be—do not deliver the workpiece prior to a give time—. Other kinds of constraints may also be employed. For example, a constraint may allocate a portion of a system resource to a system element that is assigned a task. For instance, the goal of moving a workpiece from point A to point B might be associated with a constraint limiting a peak power consumption associated with the task. Such a constraint might ensure that other cooperating controllers are able to draw enough power from a shared system power source to perform their assigned tasks or achieve their respective goals.

Referring to FIG. 1, a first system 104 embodiment includes a plurality 106 of controllers. For example, the plurality 106 of controllers includes a first, second, third, fourth and fifth controller 108, 110, 112, 114, 116. The controllers may, for example, be associated with actuators and sensors. For instance, the first, second and third controllers 108, 110, 112 are associated with first, second and third sets of actuators 118, 120, 122 and first, second and third sets of sensors 124, 126, 128. The fourth controller 114 is associated with a fourth set of actuators 130. The fifth controller 116 is associated with a fourth set of sensors 132. The actuators 118, 120, 122, 130 and sensors 124, 126, 128, 132 manipulate or sense objects in, or aspects of, respective portions of the system 104. For example, the first set of actuators 118 and first set of sensors 124 are associated with a first portion 140 of the system 104. The second set of actuators 120 and the second set of sensors 126 are associated with a second portion 142 of the system 104. The third set of actuators 122 and the third set of sensors 128 are associated with a third portion 144 of the system 104. The fourth set of actuators 130 are associated with a fourth portion 146 of the system 104 and the fourth set of sensors 132 are associated with a fifth portion 148 of the system 104.

Some or all of the system portions may be tightly coupled. Tightly coupled systems or system portions are those wherein the performance or activities of a first system portion has an effect on the performance or activities of a second portion. In such configurations, if the activities of the first portion and the second portion are not coordinated, they may interfere with or disrupt each other. For instance, in an automotive system, an engine/transmission subsystem may be considered to be tightly coupled with a braking subsystem because an uncoordinated application of the braking system may interfere with or prevent the engine/transmission system from propelling a vehicle.

In the embodiment illustrated in FIG. 1, first, second and third elements of system dynamics 152, 154, 156 tightly couple the second system portion 142 to the third system portion 144, tightly couple the third system portion 144 to the fourth system portion 146 and tightly couple the fourth system portion 146 to the fifth system portion 148. The first system portion 140 is illustrated as having only a loose or minimal interaction with the second system portion 142 and is not tightly coupled thereto.

The first system 104 may also include a high level element 160. For example, the high level element 160 may be a scheduler and/or a planner. The high level element 160 determines which tasks are to be performed, or which workpieces are to be processed, and activates, spawns or instantiates a separate coordinator for each task or workpiece. For example, a first coordinator 170 is activated or spawned in association with a first task or workpiece, and a second coordinator 180 is activated or spawned in association with a second task or workpiece. The coordinators 170, 180 are activated and initialized in such a manner as to prevent interference between the coordinators.

For example, if the first task or workpiece and the second task or workpiece both require the services of the first, second, third, fourth and fifth system portions 140, 142, 144, 146, 148, then, for example, the first coordinator 170 is activated and takes control of first system portion 140 by communicating with the first controller. The activation of the second coordinator 180 may be delayed until the first coordinator 170 no longer requires the services of the first system portion 140. Alternatively, the second coordinator 180 is activated early and directed to wait or idle until such a time as the first coordinator 170 no longer needs the services of a first system resource (e.g., 140).

The first coordinator 170 releases the first controller 108 when the first task or workpiece no longer needs the services of the first system portion 140. The first coordinator 170 may then send commands requesting the services of another system resource (e.g., the second system portion 142) for accomplishing a second subtask. Alternatively, the first coordinator 170 may begin requesting services from the second resource before the first resource has completed a first subtask. In either case, the first coordinator 170 sequentially sends commands to the controllers (e.g., 110, 112, 114, 116) requesting services of their respective system portions (e.g., 142, 144, 146, 148). When appropriate, the first coordinator 170 sends coordinating commands to a plurality of controllers. For example, if a subtask requires coordinated activity between two or more system portions at once, then the coordinator generates and communicates commands to two or more controllers associated therewith.

In FIG. 1, the first system 104 embodiment is depicted at a point in time wherein the first task or workpiece requires the services of the fourth system portion 146 and the first coordinator is communicating with the fourth controller 114. Proximate to issuing commands to, or taking control of, the fourth controller 114, the third controller 112 may have been deactivated or released from the control of the first coordinator 170. For example, commands previously issued to the third controller 112 might have been associated with an expiration parameter. The expiration parameter may be, for example, a time limit or a processing milestone. When an event occurs that matches or surpasses the value of the expiration parameter, the third controller 112 may be deactivated or released from the control of the first coordinator 170.

Alternatively, the first workpiece or task may require simultaneous services of both the third system portion 144 and the fourth system portion 146. In that case, the first coordinator generates and communicates coordinated or cooperative commands to the third 112 and fourth 114 controllers.

At an appropriate point, the first coordinator will generate and transmit or communicate demands requesting services of the fifth system portion 148. If the services of the fifth system portion are required contemporaneously with the services of fourth 146 and/or third 144 system portions, then the first coordinator 170 generates and communicates cooperative commands to the fifth 116, fourth 114 and/or third 112 controllers.

FIG. 1 also illustrates the second coordinator 180 to be in communication with the second controller 110. For example, the second coordinator 180 is requesting services of the second system portion 142. The first controller 108 is being, or has been, released from serving the second coordinator 180, and the second coordinator 180 is preparing or will prepare to take control, or request the services of, the third system portion 144 through the third controller 112. Since the second 142 and third system portions are tightly coupled 152, the second controller may generate and communicate cooperative commands to the second 110 and third 112 controllers, thereby directing them to perform cooperative operations or processes on the second task or workpiece.

When the first controller 108 is released or deactivated, it becomes available to execute commands of yet another coordinator (not shown) which the high level element 160 may activate, spawn or instantiate, to coordinate and orchestrate a third task or workpiece processing.

To maintain system resource allocation flexibility and to minimize demands on system communication resources, when controllers (e.g., 108-116) are released from the control of a coordinator (e.g., 170, 180) the controllers (e.g., 108-116) transition to an idle or off state. In the idle or off state, the controllers (e.g., 108-166) do not receive status information regarding processes of the system. It may even be unknown as to which of a plurality of processes or tasks being conducted by the system will next need the services of the controller. Therefore, when a coordinator (e.g., 170, 180) or other supervisory element needs to assign a subtask to a controller, that controller must first be synchronized or made aware of a current state of a process the newly activated controller is about to take part in.

Figure 2:
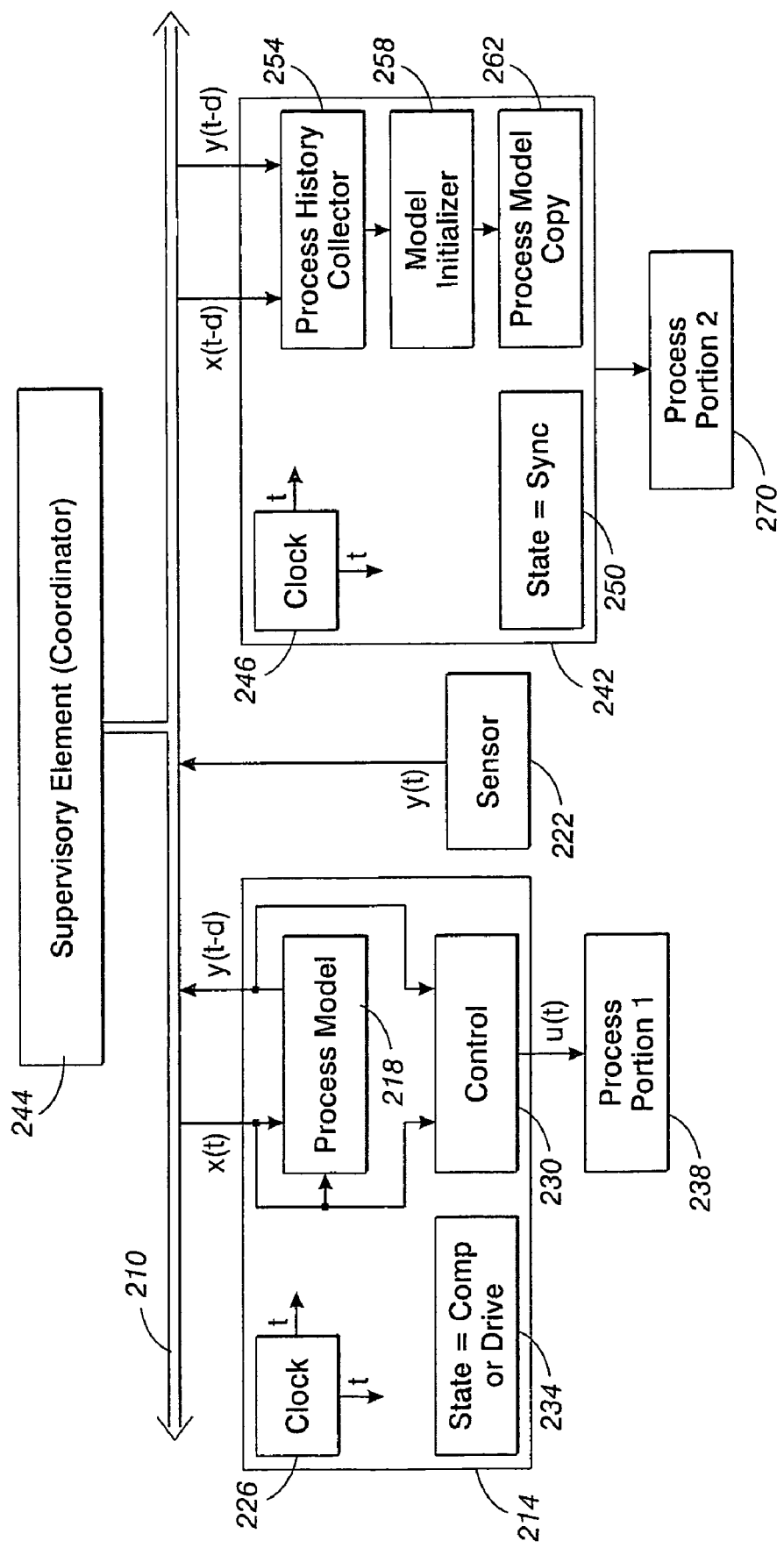
FIG. 2 is a more detailed block diagram of a portion of a system wherein a second process or controller is in a synchronization state and is being synchronized to a first process or controller.

Referring to FIG. 2, in order to keep track of the state of a process wherein information regarding the state of the process is communicated over a network 210 which is associated with network delays, a first process or controller 214 maintains or has access to a process model 218. For example, the model 218 predicts a next state (x(t+1)) from a function (e.g., f(x(t),y(t−d),t) of a current state x(t), delayed sensor 222 data y(t−d) and time t. As mentioned above, the network 210 is associated with transmission delays. Therefore, the process model 218 is adapted to accept as input sensor 222 data that is delayed by a maximum delay period (d). The sensor 222 data is represented as a function of time y(t). Sensor data delayed by the delay period is represented as y(t−d). The process or controller 214 includes a clock 226 that makes the current time t available to all process or controller 214 components, including the process model 218 and a control section 230.

For example, the control section 230 may generate a control output u(t) that is also a function of the current state x(t) of the process model 218, delayed sensor 222 data y(t−d) and the current time t.

A current state 234 of the first process or controller 214 is indicated as a "computational" or a "drive" state. The drive state of a process or controller is one in which the process or controller is actively performing a function, such as controlling an actuator or process portion 238. The computational state of a process or controller is one in which the process or controller is calculating drive output levels (e.g., u(t)) in preparation for transitioning to a drive state.

As indicated above, in systems (e.g., 104) where separate processes or controllers need to behave in a coordinated manner, such as in tightly coupled systems which may act on a workpiece simultaneously or contemporaneously, it can be necessary for a newly activated process or controller to operate based on the same information as the processes or controllers with which the newly activated controller is to cooperate. However, because of the delays associated with the network 210, a second, or newly activated, process or controller 242 (for example, a process or controller activated by a coordinator or supervisory element 170, 180, 244) cannot immediately know the current state (e.g., x(t)) of the process or process model 218 of the first process or controller 214. All that can be available to the second process or controller 242 is delayed state information (e.g., x(t−d), y(t−d)) and the current time t (from the second processes or controller's own internal clock 246). However, since the process model 218 is a function of state, measurement and time, it is possible to calculate a current state of the process model if one can collect enough information regarding historical states, measurements and times which led to the current state, as long as one knows the function of the model or process being modeled (e.g., f(x(t), y(t−d), t)). Therefore, in a "synchronization" state 250, the second process or controller 242 includes a process history collector 254 and a model initializer 258 for initializing a copy 262 of the process model 218. The function f(x(t), y(t−d), t) of the model 218 is predetermined information regarding the behavior of the state of the model 218. Therefore, this model behavior information is or can be made available to the second process or controller 242 before or during the activation process.

The process history collector 254 collects delayed state data. The delayed state data is received from the network 210 and stored until at least enough information is collected for the model initializer 258 to calculate a current state of the process model 218 and to initialize the copy of the process model 262 to the same or an equivalent state.

Figure 3:
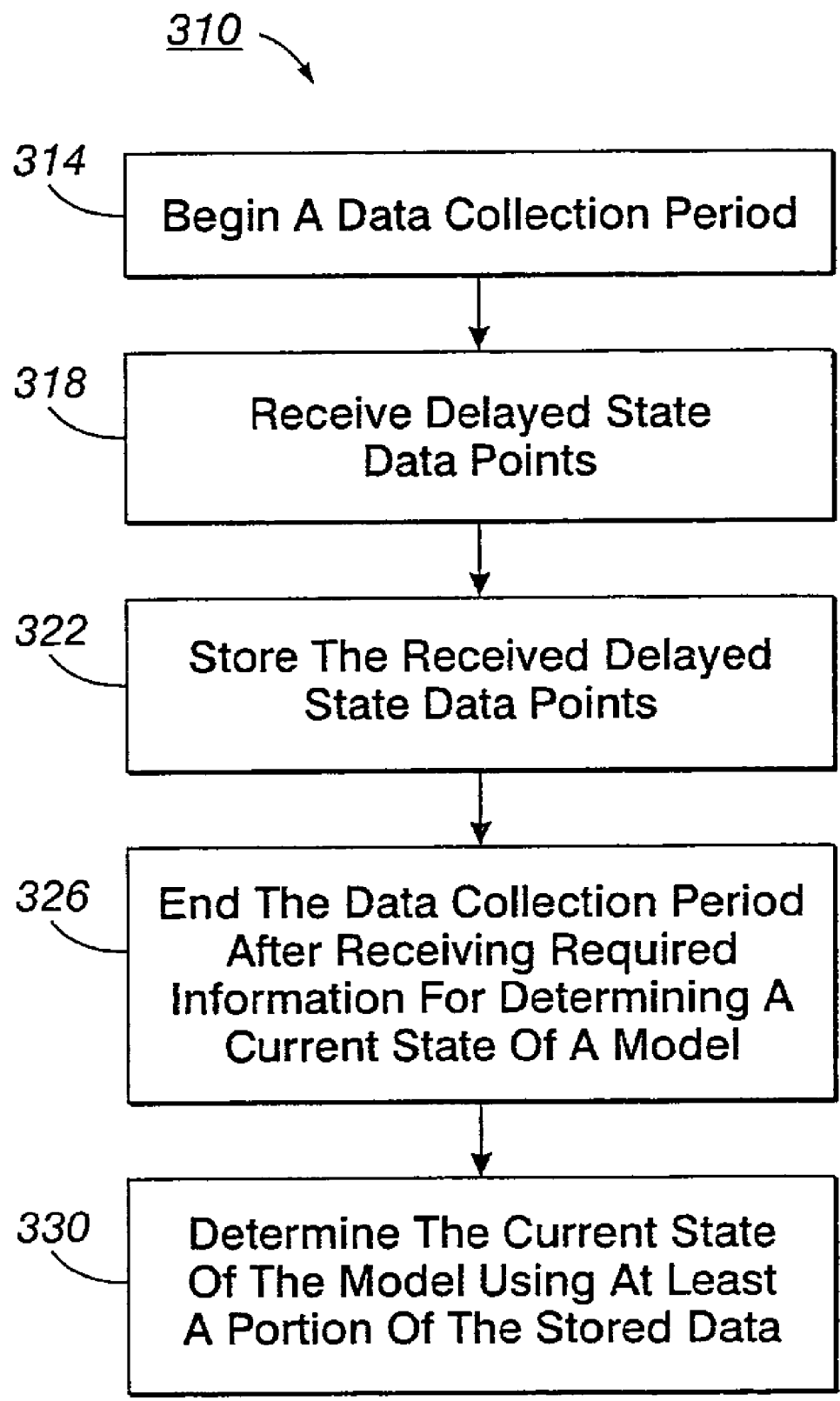
FIG. 3 is a flow chart outlining a method of synchronizing second processes or controllers to first processes or controllers.

Referring to FIG. 3, a method 310 for synchronizing a second process to a first process includes beginning 314 a data collection period, receiving 318 delayed state data points, storing 322 the received delayed state data points, ending 326 the data collection period after receiving the information required to determine a current state of the model 218 and determining 330 the current state of the model 218 using at least a portion of the stored 322 data.

Receiving 318 delayed state data points can include, for example, a process history collector 254 receiving 318 delayed state output data of the process model (e.g., {x(t−d), x(t−d+1), x(t−d+2) . . . , x(t−d+n)}). For instance, each delayed model 218 output state (e.g., {x(t−d), x(t−d+1), x(t−d+2) . . . , x(t−d+n)}) may have been used by the model 218 as input for a calculation or determination of a subsequent state. Additionally, or alternatively, receiving 318 and storing 322 delayed state data points can include receiving delayed information regarding other inputs to the process model 218.

For example, receiving 318 and storing 322 delayed state points can include receiving 318 and storing 322 delayed sensor 222 information (e.g., {y(t−d), y(t−d+1), y(t−d+2) . . . , y(t−d+n)}) that was used as input to the process model 218 to arrive at a current state of the model (e.g., x(t)).

The data collection period can be ended 326 when sufficient data has been collected to determine 330 a current state of the model. As will be explained in greater detail below, when a forward propagation technique is used, the data collection period can be ended 326 after receiving 318 and storing 322 delayed state data that represents the state of the input to and output of the model (e.g., 218) at a point in time after the beginning 314 of the data collection period. Often the data collection period can be ended 326 when a delayed state data point is received and stored 322 after the data collection period has persisted for a period of time or for a number of state times at least as long as the delay period (d) associated with the network (e.g., 210).

Determining 330 the current state of the model (e.g., 218) using at least a portion of the stored 322 data can include using a form of forward propagation to calculate a current state of the model (e.g., 218) using some of the stored 322 data and predetermined information regarding the behavior of the state of the model (e.g., f(x(t), y(t−d), t)).

Synchronized Control Processes

Consider a set of control processes $\{p_0, \ldots, p_{n-1}\}$ where each process $p_i$ runs the following state based iterations over time t=0, 1, 2, . . .

$$x_i(t+1)=f(x_i(t),y_i(t-d),t); x_i(0)=x_{i0}$$

$$u_i(t)=g(x_i(t),y_i(t-d),t)$$

where $x_i$ is the state of an ith process or model of the process, $u_i$ is the control output of an ith process or controller (e.g., 214), $y_i$ is measurement input, d is some nonnegative fixed integer delay (e.g., network 210 delay), and f and g are some functions of state, measurement and time. Note that we make no assumptions about the spaces over which x, u or y are defined: they could be numbers, symbols, discrete or continuous. At every time step t, each process receives a new measurement input $y_i(t-d)$, and uses the recursions above to compute the next state $x_i(t+1)$ and the current control output $u_i(t)$. [For t<d, we assume that f and g are functions of only x and t, and that they do not depend explicitly on y. Hence, we can take $y_i(t)=\emptyset$ (undefined) for t<d.]

The evolution of the states and the controls is completely determined by the initial states $x_{i0}$ and the measurement inputs $\{y_i(t-d)|t\geq 0\}$. Thus, it is clear that if the initial conditions are all equal and the processes are driven with the same measurements, then the states and control outputs are identical for all time. In other words, if $$x_{i0}=x_0; \forall i$$

$$y_i(t)=y(t); \forall i, t,$$

then the processes then all run the same recursion:

$$x(t+1)=f(x(t),y(t-d),t); x(0)=x_0$$

$$u(t)=g(x(t),y(t-d),t). \quad (1)$$

Note that this is true for any functions f and g of x, y and t. We refer to such a set of processes, where the $x_i(t)$ are identical for all i and all time, as synchronized. We also refer to $u_i(t)$ that are based on, or are functions of, synchronized functions such as $x_i(t)$ as synchronized.

We derive a method (e.g., 310) for synchronizing a new or second process $p_n$ (e.g., 242), which starts at some time $t'\geq d$, to the existing processes $\{p_0, \ldots, p_{n-1}\}$, for all time $t\geq t'$ as follows. We assume $p_n$ (e.g., 242) knows f and perhaps g, but not $x_0$. We would like this method to work for any choice of functions f and g of x, y and t.

Synchronization with Delayed Measurements

At the heart of our development is the following property of the state recursions in eq. (1): The current state captures all the past. Specifically, for any time t', future values of the state $\{x(t)|t\geq t'\}$ only depend on the current state x(t') and future inputs $\{y(t-d)|t\geq t'\}$. All the effects of past inputs are "summarized" in the current state.

The property above suggests the following method for synchronization. For any $t'\geq 0$, it follows immediately from eq. (1) that a sufficient condition for $p_n$ (e.g., 242) to be synchronized with $\{p_0, \ldots, p_{n-1}\}$ for all time $t\geq t'$, and for any functions f and g of x, y and t, is to set $$x_n(t')=x(t'); \text{ at time } t'$$

$$y_n(t-d)=y(t-d); \forall t\geq t' \quad (2)$$

In fact, this condition is also necessary, since it is easy to construct simple examples of functions f and g for which synchronization for all $t\geq t'$ fails, if any part of condition (2) does not hold. We call this method instantaneous initialization, since $p_n$ (e.g., 242) receives x(t') instantly, without any delay.

Now suppose that we can set $y_n(t-d)=y(t-d)$ for all $t\geq t'$ but, because of the delay (such as the communications delay of the network 210), the second or new process $p_n$ (e.g., 242) cannot receive the current state x(t') immediately. Instead, as mentioned about with regard to FIG. 2, the second or new process $p_n$ (e.g., 242) only has access to the delayed history of the states and measurements:

$$I_d(t')=\{(x(0),y(0)),(x(1),y(1)), \ldots ,(x(t'-d),y(t'-d))\},$$

which does not explicitly contain x(t').

It turns out that synchronization based on $I_d(t')$ is still possible, albeit with a little more effort. Observe that x(t') can be computed from the information in $I_d(t')$ by first performing d iterations of the state recursion in eq. (1):

$$x(t'-d+1)=f(x(t'-d),y(t'-2d),t'-d)$$

$$x(t'-d+2)=f(x(t'-d+1),y(t'-2d+1),t'-d+1) \ldots$$

$$x(t')=f(x(t'-d+(d-1)),y(t'-2d+(d-1)),t'-d+(d-1))$$

$$=f(x(t'-1),y(t'-d-1),t'-1). \quad (3)$$

We refer to operations such as the one illustrated in eq. (3) as forward propagating the state from x(t'−d) to x(t'), and we represent it using the following shorthand notation $$x(t')=\Phi(x(t'-d)|y(t'-2d), \ldots ,y(t'-d-1))$$

[As before, we take $y(t)=\emptyset$ for t<d.]

Note that, provided that $t'\geq d$, all of the information required for the forward propagation operation, namely $x(t'-d)$ and $\{y(t'-2d), \ldots, y(t'-d-1)\}$, is available in $I_d(t')$. Furthermore, this is the only information that we need from $I_d(t')$. In other words, we only need to receive 318 a delayed history that is d time steps deep. And from that, the only value of the states (of the process or model (e.g., 218) to which the new or second process or controller $p_n$ (e.g., 242) is being synchronized) that we need is the most recently received 318, namely x(t'−d).

Thus, for t'≧d, a sufficient condition for $p_n$ to be synchronized with $\{p_0, \ldots, p_{n-1}\}$ for all time t≧t', and for any functions f and g of x, y and t, is to set $$x_n(t') = \Phi(x(t'-d)|y(t'-2d), \ldots, y(t'-d-1)); \text{ at time } t'$$

$$y_n(t-d) \equiv y(t-d); \forall t \geq t' \quad (4)$$

Once again, it can be shown that this condition is also necessary, as it is easy to construct simple examples of f and g where synchronization would fail if any part of the conditions (4) were not true.

We summarize our findings in the following:

Proposition: Let $\{p_0, \ldots, p_{n-1}\}$ be a set of processes running (1). A new process $p_n$, which knows f (and, in some cases, g), can be synchronized with the given set from time t' onwards, and for any functions f and g of x, y and t, if and only if, the following conditions hold: $p_n$ receives the same input measurements $\{y(t-d)|t \geq t'\}$ and either:

1. t'≧0 and, at time t', $p_n$ has access to x(t'), for synchronization via instantaneous initialization (2);
2. t'≧d and, at time t', $p_n$ has access to x(t'-d) and $\{y(t'-2d), \ldots, y(t'-d-1)\}$, for synchronization via forward propagation (4).

Asynchronous Delayed Measurements and Histories

We now consider the problem of synchronization with asynchronous measurements. By asynchronous measurements, we mean that at certain times, some of the elements of the measurement sequence $\{y(t-d)|t \geq 0\}$ could be missing, but the ones that arrive do so in the right order. Also, some of the states could be missing from the history $I_d$. We will use the symbol ∅ to denote missing measurements or states; it should be interpreted as meaning "no information".

This asynchronous measurements scenario can still be modeled by equation (1) as follows: at each time t, define y(t-d) as:
if measurement arrives $$y(t-d) = \begin{cases} y_m(t-d); & \text{if measurement arrives} \\ \varnothing; & \text{otherwise} \end{cases}$$

where $\{y_m(t-d)|t \geq 0\}$ is some uncorrupted sequence of measurements. Thus the asynchronous measurements scenario is essentially nothing but a particular instance of equation (1), for some specific measurement sequence $\{y(t-d)|t \geq 0\}$ defined above. The fact that for some values of t, y(t-d) might take on the value of ∅ is immaterial since, as mentioned in the first section, we have made no particular assumptions about the spaces over which the measurements are defined. Also, f and g should be well defined for all possible values of y, including ∅. Practically, this means that f and g will have the form:

$$f(x(t), y(t-d), t) = \begin{cases} f_m(x(t), y_m(t-d), t) & \text{if measurement arrives} \\ f_\varnothing(x(t), t) & \text{otherwise} \end{cases}$$

$$g(x(t), y(t-d), t) = \begin{cases} g_m(x(t), y_m(t-d), t) & \text{if measurement arrives} \\ g_\varnothing(x(t), t) & \text{otherwise} \end{cases}$$

In other words, when y supplies no information, then f and g do not depend explicitly on y.

Synchronization with Asynchronous Delayed Measurements and Histories

Since we have shown that the asynchronous delayed measurements scenario can be modeled by equation (1), the conditions for synchronization are given in our Proposition. We will now apply the conditions of the Proposition to this specific asynchronous measurements context.

It follows immediately from the Proposition that synchronization using instantaneous initialization always works in this asynchronous case.

Now consider forward propagation. In this case, the Proposition states that synchronization (e.g., 310) at a time t'≧d using forward propagation is possible if and only if: the second or new process $p_n$ (e.g., 242) receives 318 the same measurements for all t'≧d and, at time t', the second or new process $p_n$ (e.g., 242) has access to (e.g., receives 318 and stores 322) x(t'-d) and $\{y(t'-2d), \ldots, y(t'-d-1)\}$. Note that, due to missing measurements or states, in general, at a given time t', the delayed state and measurement history (e.g., the data stored 322 by the process history collector 254) $I_d(t')$ will have the form:

$$I_d(t') = \begin{cases} \{\ldots, (x(t'-d), y(t'-d))\}; & \text{if state arrives} \\ \{\ldots, (\varnothing, y(t'-d))\}; & \text{otherwise} \end{cases} \quad (5)$$

where "state" in (5) refers to the delayed state x(t'-d). From (5), we see that for all t'≧d, $I_d(t')$ will always contain the information $\{y(t'-2d), \ldots, y(t'-d-1)\}$. Entries of ∅ for y pose no problem, since they represent what was actually used in f and g in (1) for $\{p_0, \ldots, p_{n-1}\}$. However, (5) also shows that it could happen that, at certain times t'≧d, $I_d(t')$, does not contain x(t'-d). At such times, synchronization using the forward propagation technique in (4) is not possible, and one would have to wait until a time t''>t', when x(t''-d) is available, to use forward propagation.

Thus we conclude that in the asynchronous case, synchronization using forward propagation is only possible at times t' when delayed state x(t'-d) is available. Otherwise it is necessary to wait to end 326 the historical data collection period until a time at which the delayed state is available.

State Machine Implementation

This section gives an example of how the synchronization mechanism can be used in practice. The goal in this example is to synchronize $p_n$ (e.g. 242/262) to $\{p_0, \ldots, p_{n-1}\}$ (e.g., 214/218) from time tDrive until a time tOff. This will be accomplished by embedding the process in a finite state machine (FSM), e.g., 234, 250.

Figure 4:
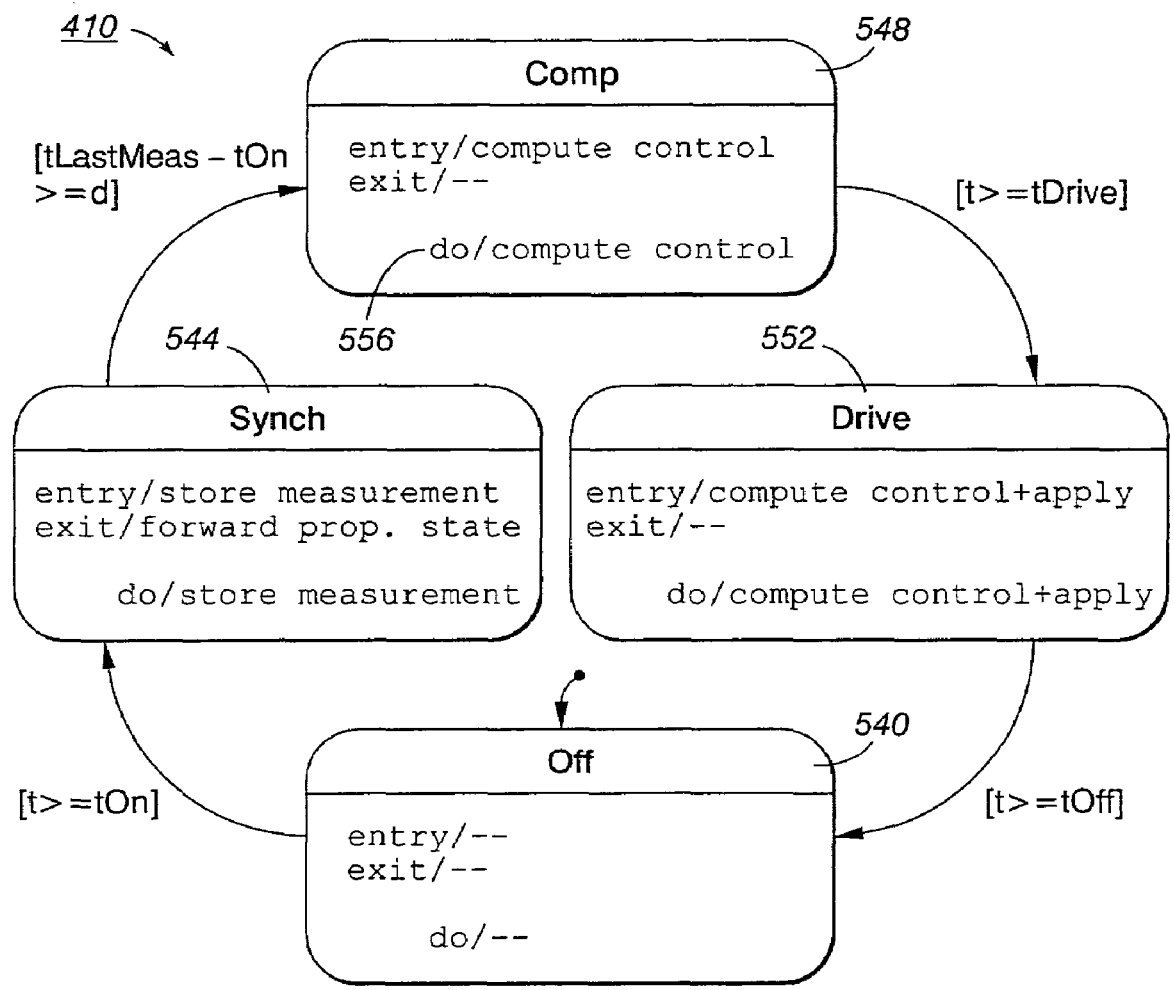
FIG. 4 is a simplified state diagram showing a relationship between four possible states of a process or controller.

Referring to FIG. 4, the FSM is described by a state chart 410. The state chart 410 is event driven, for example, by the clock tick events, which occur at integer multiples of $T_s$, a control sample period. At each clock tick, the FSM performs actions based on which state it is in. Usually, this is the action specified in the "do" statement. However, upon the assertion of certain guard conditions, the state machine may transition to another state. If this is the case, then the overall transition operation will consist of three steps: performing the exit actions of the current state, changing the name of the state, and performing the entry actions of the new state.

Figure 5:
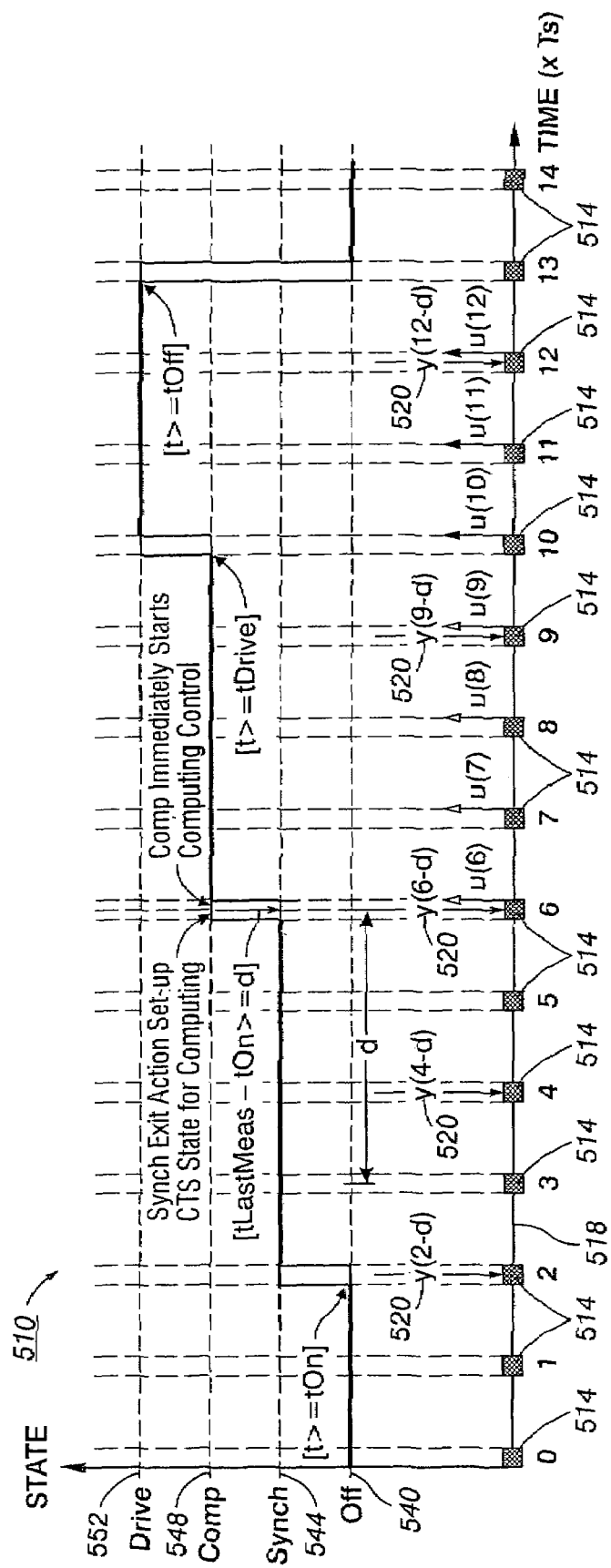
FIG. 5 is a timing diagram illustrating transitions between states illustrated in FIG. 4.

Referring to FIG. 5, it is assumed that all the processing takes place very quickly and this is shown in a timing diagram 510 by black slabs 514 on the time axis 518. Processing includes all the discrete state machine operations such as accepting inputs, exporting outputs, checking guard conditions, entry and exit actions, changing state, etc., as well as the continuous operations such as control computation and forward propagation to determine 330 a current state of a process or controller (e.g., 214, 218) being synchronized to, using equations (1) and (3), etc. To keep things simple in this example timing diagram 510, we assume the delayed y measurements and x states always arrive (or fail to arrive) simultaneously, thus the y symbols 520 shown denote $(x,y_m)$ pairs, and $(\emptyset,\emptyset)$ pairs are omitted for clarity.

The FSM has four states: off 540, synch 544 (e.g., 250), compute 548, and drive 552 (e.g., 234). In the off-state, the FSM waits until a time tOn or a command or message from a supervisory or coordinating element (e.g. 244, 170, 180), at which point it transitions to the synch-state. The time tOn is chosen to be sufficiently in advance of tDrive, to provide enough time for a process history collector (e.g., 254) to receive 318 and store 322 the required delayed state data measurements and for a model initializer (e.g. 258) to initialize a copy (e.g. 262) of an appropriate process model before tDrive. For example, in the process history collector 254, the synch-state collects measurements, until a time when it has a delayed measurement and state history that is d time steps deep and a state measurement arrives. At that point it exits the synch-state and the model initializer 258 initializes the process model (e.g., 262) by forward propagation. Then the new or second processor controller 242/250 transitions to the compute-state, and executes the entry action, namely performing a first iteration of (1). It then continues to perform the control computation of equation (1), as shown in a do-statement equation 556, until a time tDrive or another command is received from the supervisory element (e.g., 244, 170, 180), at which point it transitions to the drive-state. The drive-state is very similar to the compute-state, except that, as mentioned above, the control is actually applied to the target system element. Then, at a time tOff, the FSM turns itself off or is commanded to the off state 540. This whole process is illustrated in the timing diagram of FIG. 5.

Hence by embedding the new or second process $p_n$ (e.g., 242) in an FSM, the desired synchronization can be accomplished in practice.

A numerical example may be helpful in understanding forward propagation and embodiments of the method 310 for synchronizing a second process to a first process. While in an off state (e.g., 540) a process or controller (e.g., 242) is dormant except for determining whether its time to move to the synchronization state (e.g, 544, 250). For example, the second process or controller (e.g., 242, 108-116) may monitor a network (e.g., 210) for activating commands from a supervisory device (e.g., 244, 170, 180). Alternatively, the process or controller (e.g., 242, 108-116) may have instructions to switch to the synchronization state (e.g, 544, 250) at a predetermined time (e.g., tOn) and be set to transition upon the arrival of that time.

When the second process or controller (e.g., 242, 108-116) transitions to the synchronization state (e.g, 544, 250) a data collection period 314 begins and a process history collector (e.g., 254) begins receiving 318 and storing 322 delayed state data. The data collection period may end 326 when the process history collector (e.g., 254) has received and stored sufficient data to perform forward propagation. For instance, referring to the example of FIG. 5, tOn=2 and the network delay is d=3 control sample periods long. At t=2 delayed state data points $(y(2-d), x(2-d))=(y(-1), x(-1))$ are received 318 and stored 322 by a process history collector (e.g., 254) in a memory device associated with a new or second process or controller (e.g., 242). At t=3, $(y(0), x(0))$ are unavailable and null values are stored 322. At t=4, $(y(1), x(1))$ are received 318 and stored 322. At t=5 $(y(2), x(2))$ are unavailable and null values are stored. At t=6 $(y(3), x(3))$ are received 318 and stored 322.

Also, at t=6, sufficient data to perform forward propagation has been collected and the current state of the model to which this second process or controller (e.g., 242, 108-116) is being synchronized can be determined 330. For example, From equation (3) and the stored data, the model initializer (e.g. 258) calculates $x(6-3+1)=f(x(6-3),y(6-3-3),6-3)$ or $x(4)=f(x(3),y(0),3)$. The model initializer (e.g. 258) is able to do this because the model initializer (e.g. 258) has access to predetermined information regarding the behavior of the state of the process or model (i.e.; the model initializer (e.g. 258) has access to $f(x(t),y(t-d),t)$ of the first process or controller or the process model thereof (e.g. 214/218) and x(3) was stored at t=6. At t=3, y(0) was unavailable (to both the first and second process or controllers) and so a null value was used as input to the first process or controller model 218 and was stored 322 at t=3 and is used as input to this stage of the forward propagation. Next, the model initializer (e.g. 258) calculates $x(5)=f(x(4),y(1),4)$. This is possible because x(4) was calculated above and y(1) is a portion of the data received 318 and stored 322 during the data collection period at t=4. At this point, the current value of the first process or model (e.g., 214/218), $x(6)=f(x(5), y(2),5)$, is calculated from x(5), which was calculated above, and from the null value for y(2) which was stored 322 at t=5. A controller output value $u(6)=g(x(6),y(3), 6)$ can also be calculated. For example, x(6) was just calculated above and y(3) was received 318 stored 322 at t=6.

The new or second process (e.g., 242) now has enough information to transition to the computation state (or to the drive state). In the computation state (comp) the new or second process (e.g., 242) uses (1) to maintain synchronization. For example, in anticipation of t=7, both the first 214/218 and second 242/254 processes or controllers can calculate $x(7)=f(x(6), y(3),6)$. The model output x(6) was calculated by both processes or controllers as described above, and y(3) was stored by both process or controllers at t=6. Future states and outputs can be calculated as new delayed measurements (y(t−d)'s) are received and new x's are calculated by local models (e.g., 218, 254).

Role of Synchronization in Tightly Coupled Printing Systems

We will now describe the role of the synchronization technique described above can play in the distributed control architecture of a tightly coupled printing system. In such systems, some transport actuators are referred to as "nips." The "nips" are the rollers which move the paper or print media through the system. Different nips may be controlled by independent nip controllers. All nips that are touching a sheet of paper or print media at a given time must be synchronized. New nip controllers must be able to join in the control process when the paper arrives at nips associated with the new nip controllers while other nip controllers may be deactivated when a sheet of paper is no longer in contact with them. All communication of measurements and states to the nip controllers can be across a network (e.g., 210), with a worst case delay of d. The measurements are asynchronous because they are triggered by edge crossings (sheets of paper interacting with edge detection sensors).

Figure 6:
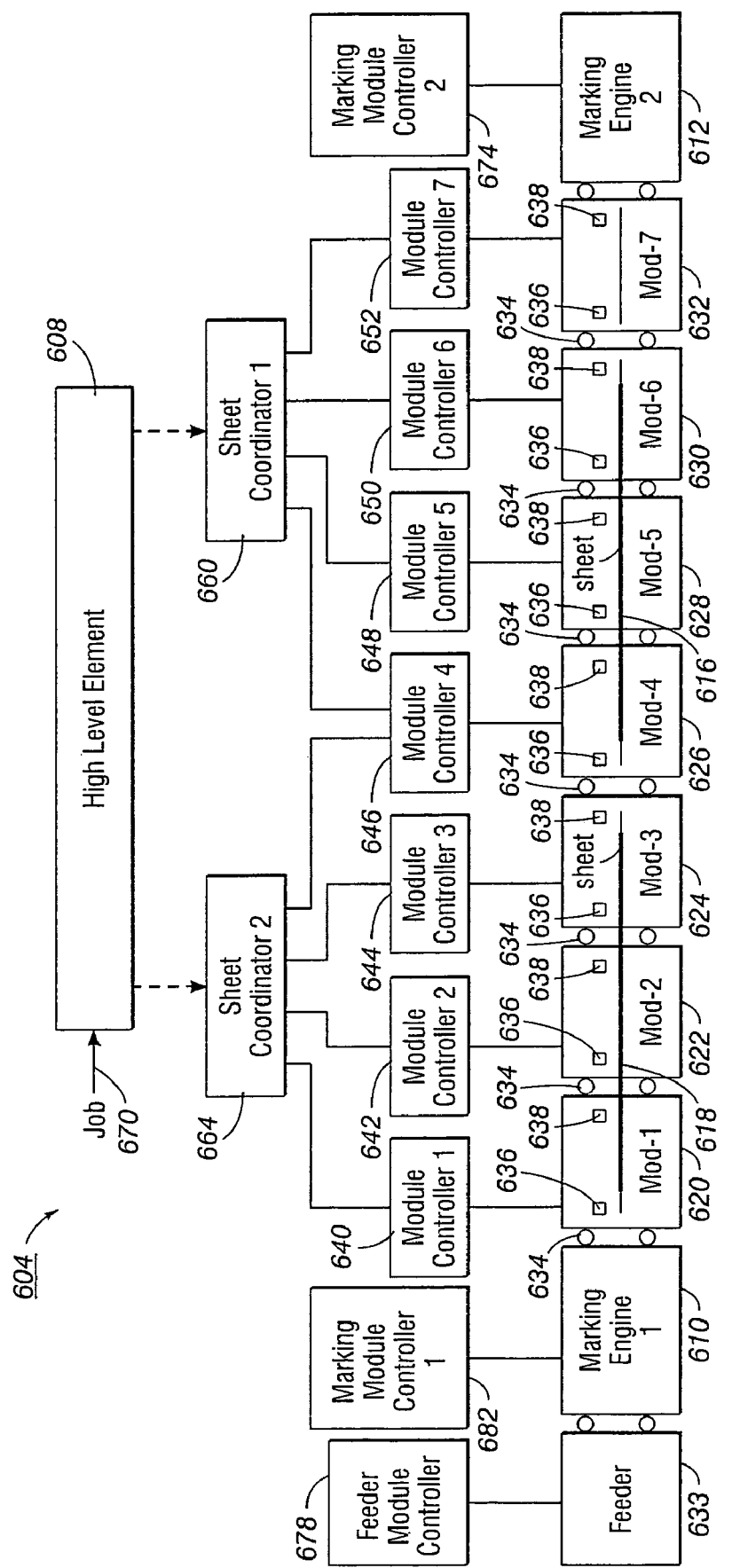
FIG. 6 is a block diagram of a document processing system wherein elements of the system may be synchronized according to the methods of FIG. 3.

Referring to FIG. 6, an embodiment of a document processing system 604 includes a high level element 608, a first marking engine 610, a second marking engine 612 and a transportation system 614.

For example, the first and second marking engines 610, 612 may be xerographic marking engines. Alternatively, one or more marking engines of an embodiment may be of other technologies, such as, but not limited to, ink jet marking technology.

The transportation system 614 transports print media such as a first sheet 616 and a second sheet 618 between the first marking engine 610 and the second marking engine 612. In the illustrated system 604, the transportation system includes a plurality of transport modules. For instance, the plurality of transport modules includes a first, second, third, fourth, fifth, sixth and seventh transport module 620, 622, 624, 626, 628, 630, 632. The system 604 may include additional modules. For example, the additional modules may include a media or paper feeder 633, which delivers sheets of print media or paper to one or both of the marking engines 610, 612. Additional modules (not shown) may transport print media from either or both marking engines 610, 612 to other devices, including, but not limited to, additional marking engines and/or output devices such as paper trays, stackers, collators, staplers and other binders. Furthermore, the plurality of transport modules may form paths that branch off from the illustrated path (620, 622, 618, 624, 626, 630, 632) to transport sheets to other marking engines (not shown) or other devices.

In the illustrated document processing system 604, each transport module 620-632 includes transport actuators. For example, the transport modules 620-632 include motor driven nips 634 for driving or urging print media through the transport system 614. Additionally, or alternatively, the modules 620-632 may include flippers or gates for redirecting print media toward other portions (not shown) of the transportation system 614. Furthermore, the modules may include other kinds of transport actuators. For instance, air jets and/or spherical nips may be included in the transport modules (e.g., 620-632). The transport modules 620-632 of the document processor system 604 include sensors (e.g., 222). For instance, the sensors may be sheet presence or position sensors. Sensors that report speed or trajectory may also be included instead or in addition. Alternatively, such parameters may be calculated from a series of position measurements reported by a series of sensors. As illustrated, each module 620-632 includes a left side sensor 636 and a right side sensor 638.

Each transport module 620-632 also includes or is associated with a respective module controller 640, 642, 644, 646, 648, 650, 652 (i.e., embodiments of first and second processes or controllers 214, 242). For example, the module controllers 640-652 control the actions of the transport actuators (i.e., embodiments of first and second process portions 238, 270) of their respective modules 620-632 and receive and relay information from their respective sensors 636, 638.

The high level element 608 (e.g., an embodiment of high level element 160) is operative to generate sheet processing task descriptions or itineraries describing respective sheet processing tasks, to activate respective sheet coordinators (e.g., a first sheet coordinator 660 and a second sheet coordinator 664, which are embodiments of supervisory elements or coordinators 170, 180, 244) and to communicate the respective sheet processing task descriptions to the respective sheet coordinators (e.g., 660, 664). For example, the supervisory element 608 receives a job description 670. The job description 670 may include descriptions of sheets or pages. The descriptions may include images, or references to images stored elsewhere and indications as to an order in which the images are to appear on sheets of print media. For example, the job description 670 includes page description language describing text and fonts and graphic items as well as their location on particular pages of a document. The high level element 608 activates, instantiates or spawns a sheet coordinator (e.g., 244) for each sheet or page (a sheet may have two sides and may, therefore, comprise two pages). The high level element 608 analyses the job description 670 and may schedule or plan operations to create the document described in the job description 670. In so doing, the supervisory element 608 generates respective sheet processing task descriptions or itineraries for the transportation and processing of sheets between system resources.

For instance, regarding the transportation of a sheet between system resources, an example itinerary or sheet processing task description may have the following form:

Itin 1 1 11
feeder1 feed 19.544
me1 print image27 20.201
m1 left2right 23.341
m2 left2right 23.495
m3 left2right 23.625
m4 left2right 23.755
m5 left2right 23.885
m6 left2right 24.015
m7 left2right 24.145
me2 print image28 24.275
finisher1 stack 27.415

The first line is, for example, an itinerary or sheet processing task description identifier. The rest of the itinerary specifies, for example, that a component named feeder1 (e.g., 633) should feed a sheet at time 19.544, then a component named me1 should execute a print action on an image named image27 at a later time, then a component named m1 should execute an action (move the sheet left to right) at a still later time, and so on.

The respective sheet coordinators (e.g., 660, 664) are operative to receive the respective sheet processing task descriptions or itineraries and, based on those respective descriptions, identify a plurality of respective sheet processing subtasks to be performed in order to complete the respective sheet processing tasks, identify respective controllers (e.g., 214, 242, 640-652, 674-682) for controlling respective process actuators to perform the respective sheet processing subtasks, generate respective commands for performing the respective sheet processing subtasks and communicate the respective commands to the respective module controllers as appropriate to the respective subtasks. Additionally, the respective sheet coordinators (e.g., 660, 664) may identify respective information sources that are able to provide progress information regarding the performance of the respective subtasks, collect the respective progress information from the respective subsets of information sources and communicate the respective progress information to the respective module controllers as appropriate to the respective sheet processing subtasks.

For example, the information sources may include the sensors 636, 638. Additionally, or alternatively, the module controllers themselves may maintain models (e.g., 218, 254) or estimators of the progress of respective subtasks. Such models are referred to as sheet observer models. In this regard, the module controllers or the estimates (e.g., x(t)) or models of the module controllers may be considered information sources.

For instance, in the illustrated document processing embodiment 604, subtasks for a first sheet may have included matching a speed of nips 634 of the first module 620 to a speed of a sheet exiting the first marking engine 610 and receiving the first sheet 616 therefrom. A second subtask might have been for nips 634 of the second module 622 to match the speed of the first sheet 616 as it exited the first module 620. A subtask of the third module 624 may have been to match the speed of the first sheet 616 as a leading edge thereof exited the second module 622. Yet another subtask may have been for the nips 634 of the first, second and third modules 620, 622, 624 to accelerate or to begin to accelerate the first sheet 616 to a higher transportation system 614 transport speed.

Additional subtasks associated with the fourth, fifth and sixth modules 626, 628, 630 may have included matching associated nip 634 speeds to the speed of the first sheet 616 as it entered each module 626, 628, 630 and/or continuing to accelerate the sheet 616.

The transfer or movement of a sheet from module to module must be done in a coordinated manner. In the document processing embodiment 604, the modules 610, 612, 620-633 are tightly coupled by their relationship to a sheet. For example, at any given point in time, a plurality of modules may be in contact with the same sheet. If the nips 634 of modules contacting a sheet are driven at different speeds or with different rates of acceleration or deceleration, the sheet (e.g., 616, 618) may be damaged or distorted in a manner that causes a jam in the transportation system 614 or system 604 as a whole. The sheet coordinators (e.g., 660, 664) ensure cooperative or coordinated actuation of the actuators or modules (e.g., 610, 612, 620-633). For example, at the instant depicted in FIG. 6, the first sheet 616 is in contact with portions of the fourth, fifth and sixth modules 626, 628, 630. The first sheet coordinator 660 is shown in communication with the fourth, fifth, sixth and seventh module controllers 646-652. For example, the first sheet controller 660 may be sending commands to the fifth and sixth module controllers 648, 650 that result in the fifth and sixth modules 628, 630 driving the first sheet 616 in a cooperative manner. For instance, the fifth and sixth module controllers 648, 650 may be directed to begin decelerating the first sheet 616. Additionally, the first sheet coordinator 660 may be requesting or receiving sensor information or sheet observer model information from the fourth module controller 646. For instance, the first sheet coordinator 660 may be requesting to be notified when a trailing edge of the first sheet 616 passes the left sensor 636 of the fourth module. Additionally, the first sheet coordinator 660 may be asking or receiving sensor information from the sixth module 630. For instance, the first sheet coordinator 660 may be requesting to be notified when a leading edge of the first sheet 616 passes or enters a field of view of the right sensor 638 of the sixth module.

This sensor information may be relayed by the sheet coordinator to the seventh module controller 652. Additionally, or alternatively, the first sheet coordinator 660 may update a model, such as a world observer model of the task or of the subtasks based on the information from the information sources or sensors (e.g., 636, 638).

In addition to possibly relaying sensor information, the first sheet coordinator 660 may be sending commands directing the seventh module controller 652 to prepare the seventh module 632 to receive the first sheet 616. For instance, the seventh module controller 652 may be directed to synchronize (e.g., 310) itself to the world observer (not shown) of the first sheet coordinator or to a sheet observer (e.g., similar to process model 218) of one of the other controllers (e.g., the sixth module controller 650) and to prepare to drive nips 634 of the seventh module 632 at a speed compatible with the speed of the first sheet 616 as the leading edge thereof exits the sixth module 630. As a result, the seventh module controller 652 begins 314 a data collection period and a process history collector (e.g., 254) receives 318 delayed state data points and stores 322 the received delayed state data points as described above. Additionally, when sufficient data is collected to determine a current state of the world observer model or the sheet observer model, the data collection period can be ended 326 and a model initializer (e.g., 258) determines 330 the current state of the world or sheet observer model, thereby synchronizing the new or seventh controller 652 or process to the sheet transportation process or to the activities of the sixth controller 650.

Additionally, the fifth, sixth and seventh module controllers 648, 650, 652 may be receiving commands directing that they begin decelerating the first sheet in preparation for its entry into the second marking engine 612. The first sheet coordinator 660 may also be transmitting commands to the fourth module controller 646 releasing it from service or subtasks related to the transportation of the first sheet 616. Alternatively, prior commands may have included an expiration event, such as a time limit or sensor reading, the occurrence of which automatically deactivates or releases the fourth module controller from services related to the first sheet 616.

At a point later in time than the instant depicted in FIG. 6, the first sheet 616 may enter the second marking engine 612 for processing. For example, the second marking engine may be used to print an image on a second side of the first sheet or may apply color markings that the first marking engine 610 did not apply. Prior to that, the first sheet coordinator may activate the second marking module controller 674 and direct it to synchronize 310 itself to the world model of the coordinator or to an observer model (e.g., similar to process model 218) of, for example, the seventh module controller 652 in a manner similar to the synchronization of the seventh module controller 652 described above.

At some point in time, the first sheet will no longer be in contact with the fourth module 626 and the trailing edge of the first sheet will be about to exit the fifth module. The fourth module controller 646 may have already been released (as described above) from subtasks associated with processing the first sheet and may have begun performing subtasks associated with processing the second sheet 618. The fifth module controller 648 may be about to be similarly released.

The sixth and seventh transport modules 630, 632 and the second marking engine (or module) 612 are likely all in contact with the first sheet 616. Therefore, the first coordinator 660 is generating or has generated and will communicate or has communicated commands for the sixth and seventh transport modules 630, 632 and the second marking engine 612 or a marking engine module controller 674. The commands may be cooperative in nature. For example, the transport modules 630, 632 may be directed to slow the sheet to a speed compatible with capabilities of the marking engine 612. Additionally, commands for the second marking engine controller 674 may direct it to control the second marking engine 612 to accept the first sheet at the compatible speed and to place specified marks on portions of the first sheet 616. As the first sheet 616 continues into the second marking engine 612, the sixth and seventh module controllers 650, 652 will be released from subtasks associated with the first sheet 616, or deactivated. Eventually, the first sheet 616 will exit the second marking engine or module 612 and be delivered to other modules (e.g., transport modules, finishers, stackers and/or other print engines). The first coordinator will continue to send appropriate commands to the subsequent modules, directing them to synchronize (e.g., 310), relay progress information and release or deactivate controllers, in the sequential manner described above, until the task described in the task description, or itinerary, received when the first coordinator 660 was activated is completed. When the task is completed, the first coordinator 660 may be deactivated.

Similar processing occurs with regard to the second 664 and subsequent (not shown) coordinators and second 618 and subsequent (not shown) sheets. For example, as depicted in FIG. 6, the second sheet 618 is within the first, second and third modules 620, 622, 624. The second sheet coordinator 664 is depicted as in communication with the first, second, third and fourth module controllers 640-646. For example, the second sheet coordinator 664 may be directing the second and third module controllers 642, 644 to drive the second sheet 618 at the same speed and/or with the same acceleration, receiving or requesting sensor information from the sensors 636, 638 of the first module 620 and/or the third module 624, releasing the first module controller 640 from tasks associated with transporting the second sheet 618, and/or directing the fourth module controller 646 to synchronize 310 itself and prepare to receive the second sheet 618 by driving nips 634 of the fourth module 626 at a speed appropriate to, or compatible with, a speed of the second sheet 618, as a leading edge thereof exits the third module 624 and enters the fourth module 626. As the sheets 616, 618 are transported through the system 604, the sheet coordinators deactivate or release module controllers no longer processing their respective sheets and send commands to downstream controllers directing them to synchronize 310 to respective processes and preparing them to receive their respective sheets.

Prior to the moment depicted in FIG. 6, the first coordinator generated and sent commands to a feeder module controller 678 directing it to control the feeder 633 to deliver the first sheet 616 to the first marking engine (or transport modules on a path thereto (not shown)) and may have generated and sent commands to a first marking module controller 682 instructing it to synchronize 310 to the feeder module controller 678 and to control the first marking engine 610 to place particular marks on portions of the first sheet 616 and deliver the first sheet 616 to the first transport module 620. As mentioned above, when their respective tasks, as described in their respective sheet processing task descriptions or itineraries, are completed, the respective sheet coordinators (e.g., 660, 664) are deactivated. For instance, they are de-instantiated or placed in an idle mode to await re-initialization with information from a new sheet processing task description.

Supervisory element (e.g., 170, 180, 244 660, 664) and module controller embodiments (e.g., 640-652, 674-682) may be made substantially in software stored in computer storage devices, such as memory elements, and run by computational platforms, such as microprocessors, microcontrollers, and digital signal processors. Alternatively, supervisory elements and module controllers may be embodied in various combinations of hardware and software.

In a prototype, the transport module controllers were each embodied in separate computational platforms associated with transport modules on a one-to-one basis. Each transport module included a plurality of nips and flippers. Marking engines are known to include their own controllers. The high level element 608 and activated or spawned sheet coordinators (e.g., 660, 664) were software elements run by a single computational platform. However, embodiments wherein the sheet coordinators are offloaded to a second device and/or wherein the sheet coordinators, or activating data associated with the sheet coordinators, move from module controller to module controller (e.g., 640-652, 674-682) as their respective sheets move from module to module (e.g., 633, 610, 620-632, 612), are contemplated.

The foregoing addresses the problem of initial synchronization. Once the initial synchronization is accomplished, the processes remain synchronized as long as they are provided with the identical input streams $\{x(t), y(t-d)\}$.

However, in systems such as those discussed above, as well as in other systems, including systems wherein processes are not necessarily based on the same functions (i.e., wherein f and g can be different for different processes or modules), wherein states and control outputs are not necessarily identical, and/or wherein—synchronization—is more loosely defined to mean, for example, acting in concert, or acting based on the same information, additional synchronization issues related to communications and/or processing delays may exist. That is, synchronization must be maintained, for example through providing identical input streams $\{x(t), y(t-d)\}$, in the face of these delays.

For instance, in the document processing system of to FIG. 6, the sensors 636, 638 are not directly connected to a system network. Instead, the sensors 636, 638 deliver information to their respective module controllers (640-652, 674-682). In turn, the module controllers may act as proxies for the sensors 636, 638 and use a network connection to transmit information from the sensors to other devices. For example, the fourth module controller 646 has a direct connection to the sensors 636, 638 of the fourth module 626. The fourth module controller 646 may relay information from those sensors to other devices, such as, for example, the fifth module controller 648 or the first 660 or second 664 sheet coordinator. In this example, the fourth module controller 646 has access to the sensor information of the fourth module 626 before any other device. If the fourth module controller 646 were to react to the information y(t) from the sensors 636, 638 of the fourth module 626 before, for example, the fifth module controller 648 received or was able to react to the information (at least a network delay d later), the cooperative or harmonious control relationship between the fourth module controller 646 and the fifth module controller 648 (as they act to transport the first sheet 616) could become disrupted.

This problem is not limited to document processors. For example, referring to FIG. 1, the second set of sensors 126 of the first system 104 may only provide information to other elements of the system (108, 112-116, 170, 180) through the services of the second controller 110. If the second controller 110 reacts to information y(t) from the second set of sensors 126 before the second controller 110 transmits or distributes that information to other elements, such as, for example, the third controller 112, or if the second controller 110 reacts to the information from the second set of sensors 126 before, for example, the third controller 112 receives or is able to process the information, it can have an adverse effect on the cooperative activities of the second 110 and third 112 controllers.

Even in systems such as the one illustrated in FIG. 2, wherein a sensor (e.g., 222) communicates directly with a network (e.g., 210) varying communications delays between various nodes on the network can lead to some network elements receiving, and potentially reacting to, information before other network elements. Therefore, it can be desirable to provide a mechanism to ensure that system elements react to updated information in a synchronized manner (i.e., are provided with y(t-d)).

Figure 7:
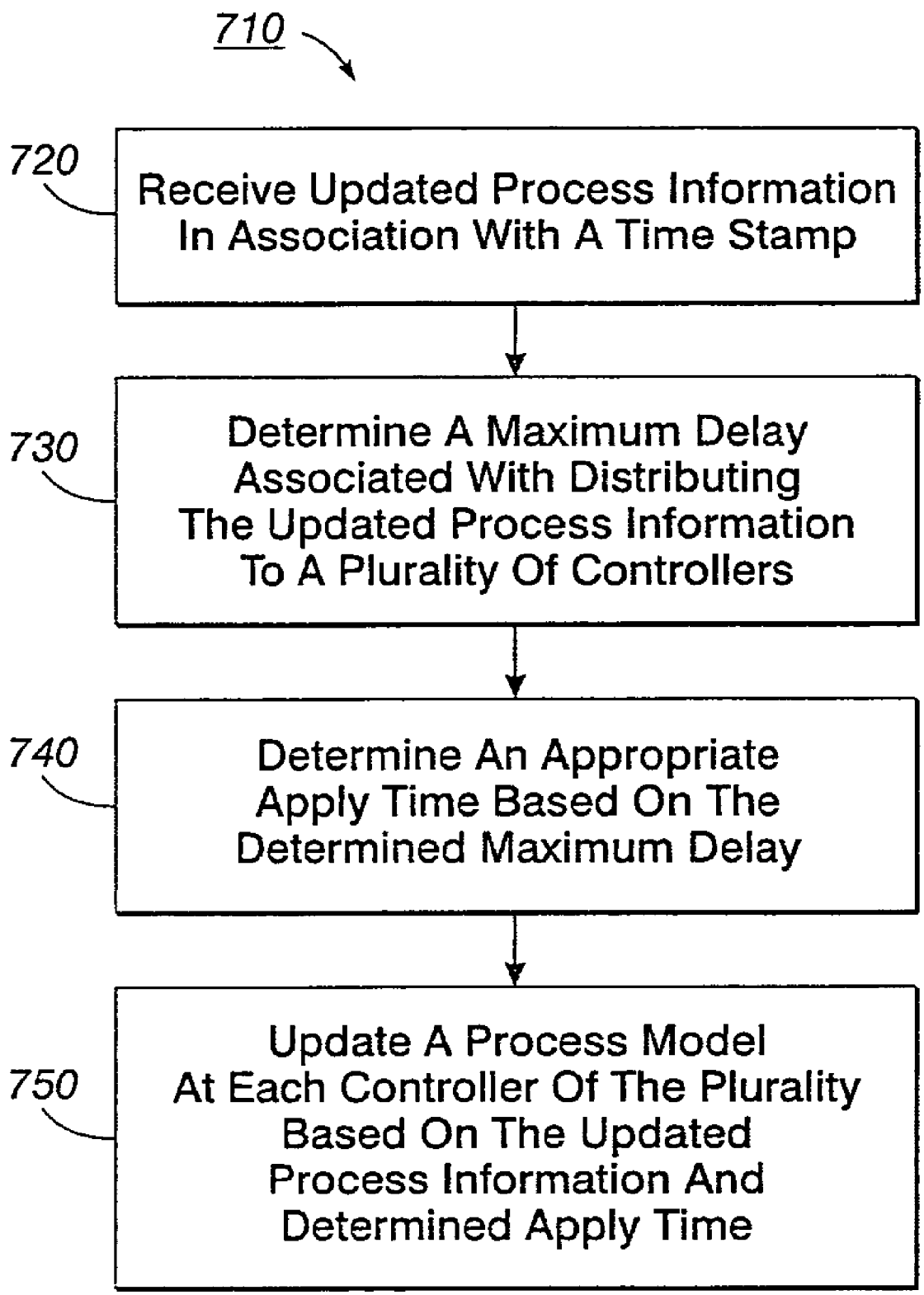
FIG. 7 is a flow chart outlining a method for synchronizing control efforts of a plurality of controllers.

Referring to FIG. 7, a method 710 for synchronizing control efforts of a plurality of controllers or processes can include receiving 720 updated process information in association with a time stamp, determining 730 a maximum delay associated with distributing the updated process information to the plurality of controllers or processes, determining 740 an appropriate apply time based on the determined maximum delay and updating 750 a process model at each controller or process of the plurality based on the updated process information, the determined apply time, and possibly the time stamp.

Receiving 720 updated process information in association with a time stamp includes a controller or process (e.g., 110, 646) receiving the information directly from a sensor (e.g., 126, 636, 638), receiving the information from a sensor e.g., 222) over a network (e.g., 210) and/or receiving the information as relayed information from an intermediate device. For example, the third controller 112 can receive 720 information from the second set of sensors 126 in a message from the second controller 110 or from another device, such as a coordinator 170, 180. The time stamp can be associated with the updated process information by the sensor itself (e.g., 222) or by a device acting as a proxy for the sensor. For example, where a sensor does not include a computational element or processor (e.g., 126, 636, 638) and is connected or wired to a device or system element (e.g., 110, 646) that includes a microprocessor or other computational element, that device may associate the sensor information with the time stamp. In this regard, one portion or software module may apply the time stamp and deliver or make available the updated process information, in association with the time stamp, to a second portion or software module of the device (e.g., 110, 646) for further processing. Therefore, the second portion or software module is considered to receive 720 the updated process information in association with the time stamp even though another portion of the same device made the association. The time stamp indicates a time at which the sensed event or data occurred or was valid.

Determining 730 a maximum delay associated with distributing the updated process information to a plurality of controllers can include accessing a maximum delay value stored during system manufacture. Additionally, or alternatively, the maximum delay may be determined 730 or updated during system commissioning. Modular systems may be configured or reconfigured in the field by adding, removing or changing or rearranging modules. This can lead to network (e.g., 210) configuration changes. Therefore, a system commissioning process may include running simulations or tests of worst case network traffic conditions wherein measurements of the maximum delay can be made. In yet another alternative, determining 730 the maximum delay can include making such measurements on an ongoing basis during actual system operation.

In addition to network communication delays, the maximum delay associated with distributing the updated process information may include elements such as the processing time required for preparing the updated process information for distribution and for preparing to react to the information after it is distributed. For example, determining 730 the maximum delay can include determining the time required to associate the updated process information with the time stamp. Additionally, in some embodiments, information received from a sensor (e.g., 126, 222, 636, 638) may be transformed before distribution. For instance, if the left sensor 636 of the fourth module reports that the first sheet 616 is no longer in the field of view of the left sensor 636, that information in its raw form might not be meaningful to the fifth module controller 648. Therefore, the fourth module controller 646 or, for example, the first sheet coordinator 660, may transform this event report into a sheet position, or anticipated sheet arrival time, before delivering the updated process information to the fifth module controller 648. Additionally, determining 730 the maximum delay may also include accounting for processing time consumed in preparing to use the updated process information. For example, the controller or process or plurality of controllers or processes to which the updated process information is to be distributed may need to perform a forward propagation (e.g., equation (3)) or perform some other simulation or estimation to determine system status at a particular point in time (e.g., the apply time) which, due to the delays described above, is a time after the updated process information was collected or valid. Therefore, determining 730 the maximum delay associated with distributing the updated process information can include combining delays associated with data processing and information transmission. For example, the processing delays can be determined during system design or manufacture and added to communications delays determined at system manufacture or during system commissioning or operation.

Determining 740 an appropriate apply time can include, for example, adding the determined 730 maximum delay to the value of the time stamp. For example, the element distributing the information (e.g., 110, 180, 214, 244, 646, 660) may determine the maximum delay and add it to the value of the time stamp received 720 in association with the updated process information to determine 740 the appropriate apply time.

The distributing element may, for instance, communicate or transmit the updated process information, or a transformed version thereof, and the determined 740 apply time to at least one cooperating controller or process. The transmission or communication (for example, over a network (e.g., 210)) may also include the time stamp received 720 in association with the updated process information. Alternatively, the receiving process or controller (e.g., 180, 112, 660, 648) determines 730 or is made aware of the maximum delay associated with distributing the updated process information and uses that information to determine 740 the appropriate apply time itself. In such cases, the distributing element (e.g., 110, 180, 214, 244, 646, 660) need only transmit the updated process information, or a transformed version thereof, and the value of the time stamp received 720 in association with the updated process information.

Updating 750 the process model at each controller of the plurality based on the updated process information and determined apply time provides for reacting to the updated information in a synchronized manner. That is, updating 750 the process model allows each controller or process to compensate or adjust for the time difference between when the updated information was collected (i.e., the time stamp) and when (i.e., the apply time) it will be reacted to or included in control or processing decisions. Due to the processing and/or communication delays described above, the updated process information indicates the status of the process at an earlier point in time. Reacting to that information as if it were current could lead to instabilities. Therefore, the updated process information is used to generate an updated 750 estimate of the status of the process at the apply time. For example, the received updated process information, or a transformation thereof, and the value of the time stamp associated therewith, is included as input into an estimating process model (e.g., 218) which is, for example, forward propagated (3) to provide an estimate of the state of the process at the apply time. When the apply time arrives, each of the controllers or processes of the plurality can produce control efforts, based on the same estimate of system status, at the same time. In this regard, local clocks (e.g., 226, 246) of the processes or controllers (e.g., 112, 648) receiving the distributed information are synchronized so that the local determinations of each process or controller as to when the apply time arrives are also synchronized.

As indicated above, in some embodiments, in order to minimize communication and processing bandwidth, the distributing elements (e.g., the controllers 108-116, 214, 242, 640-652, 674-682, and/or the coordinators 170, 180, 244, 660, 664) may take steps to identify or select particular processes or controllers to which to distribute the updated process information. A process model or the updated information itself may be used in making this selection. For example, if a model or a measurement indicates that a module (e.g., 632) is about to receive a sheet (e.g., 616), the controller associated with that module might be selected to receive the updated information. Controllers or processes associated with the modules that are not processing or are not about to process the sheet might not be selected to receive the updated information. Sensors are not the only source of updated information that the method 710 for synchronization can be applied to. For example, process information determined or generated within a controller or coordinator may also be distributed and processed according to the method. In some instances, the determination or generation of the information could be considered receiving 720 the information and an appropriate time stamp would be associated with the information as described above. Other transformations than those mentioned above are contemplated. For example, sensor information regarding the arrival or departure of a sheet at a particular location in a document processing system may be transformed into different estimated times of arrival, as appropriate to each of a plurality of transport module controllers (e.g., 640-652) in an anticipated path of a sheet of print media. Alternatively, the arrival or departure information may be combined with other departure and arrival information from other sensors and transformed into speed and relative position information or other useful parameters including, but not limited to, acceleration or deceleration information.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for synchronizing control efforts of a plurality of controllers associated with a process, the method comprising:
   receiving updated process information regarding the process in association with a time stamp indicating when the updated process information was collected;
   determining a maximum delay associated with distributing the updated process information to at least one of the plurality of controllers;
   determining, based on the determined maximum delay, an apply time at which the plurality of controllers are to react to the updated process information, and
   updating, at each controller of the plurality of controllers, a process model based on the updated process information and the determined apply time.

2. The method of claim I further comprising:
   producing a control signal, at each controller of the plurality of controllers, based on the updated process model, beginning after the determined apply time.

3. The method of claim 1 wherein receiving updated process information comprises:
   receiving feedback information from a first controller of the plurality.

4. The method of claim 1 wherein receiving updated process information comprises:
   receiving feedback information from a sensor that is operative to sense and report information regarding an aspect of the system.

5. The method of claim 1 wherein receiving updated process information comprises:
   receiving feedback information from a sensor that is operative to sense at least one of sheet position, sheet speed and sheet trajectory information regarding a sheet being processed by the system.

6. The method of claim 1 further comprising:
   transmitting the updated process information and at least one of the determined apply time and the time stamp to the plurality of controllers.

7. The method of claim 6 further comprising:
   receiving the updated process information and the determined apply time; and
   updating the process model based on the received updated process information and the determined apply time.

8. The method of claim 7 wherein determining an appropriate apply time comprises:
   receiving the updated process information and the time stamp; and
   determining the appropriate apply time based on the received time stamp and the determined maximum delay.

9. The method of claim I wherein determining a maximum delay associated with distributing the updated process information comprises:
   determining a maximum number of state periods associated with transmitting the updated process information to the plurality of controllers.

10. The method of claim 1 wherein determining the apply time based on the determined maximum delay comprises:
    adding the determined maximum delay to a maximum preparation period for the plurality of controllers to prepare to use the updated process information.

11. The method of claim 1 wherein determining the apply time based on the determined maximum delay comprises:
    adding the determined maximum delay to a maximum preparation period for the plurality of controllers to prepare to update the process models maintained by each of the controllers of the plurality.

12. The method of claim 1 further comprising:
    selecting the plurality of controllers from a superset of controllers based on at least one of the received updated process information, output of the process model and output of a second process model.

13. The method of claim 1 further comprising:
    updating a vocess model at a supervisory element.

14. The method of claim 1 wherein updating the process model based on the updated process information and the determined apply time comprises:
    using forward propagation to simulate the process forward from the time indicated by the time stamp to the apply time.

15. A system comprising:
    a plurality of controllers, each controller of the plurality being operative to control a portion of a task associated with a process;
    a distributing element that is operative to receive updated process information regarding the process, select controllers of the plurality to receive the updated process information, distribute the updated process information to the selected controllers in conjunction with at least one of a time stamp indicating when the undated process information was collected and an apply time indicating when the information is to be used.

16. The system of claim 15 wherein the distributing element comprises:
    a coordinator that is operative to receive the updated process information from at least one of a controller and a sensor, transform the updated process information to a form useful to each of the selected controllers, if necessary, and transmit the updated process information or the transformed information and the at least one of the time stamp and the apply time to the selected controllers.

17. The system of claim 15 wherein the distributing element comprises:
a first controller that is operative to receive the updated process information from at least one of an estimator within the first controller and a sensor, transform the information to a form useful to each of the selected controllers, if necessary, and transmit the updated process information or the transformed information and the at least one of the time stamp and the apply time to the selected controllers.

18. The system of claim 15 wherein each of the selected controllers are operative to produce a control signal based on the updated process information beginning after the apply time.

19. The system of claim 15 wherein the distributing element is operative to receive updated process information regarding at least one of a sheet position, sheet speed and sheet trajectory information related to a sheet being processed by the system.

20. The system of claim 15 wherein the distributing element is operative to distribute the process information by transmitting the updated process information, or a transformed version thereof, and the at least one of the apply time and the time stamp to the plurality of selected controllers over a system network.

21. The system of claim 15 wherein the selected controllers are operative to receive the updated process information, or a transformed version thereof, and the apply time and update a process model based on the received updated process information and the apply time.

22. The system of claim 15 wherein the selected controllers are operative to receive the updated process information, or transformed version thereof, and the time stamp, determine a maximum delay associated with the distribution of the updated process information or transformed version, determine an appropriate apply time based on the maximum delay and update a process model based on the received updated process information and the determined appropriate apply time.

23. The system of claim 15 wherein the distributing element is operative to select the controllers from the plurality of controllers based on at least one of the received updated process information and output of a process model.

24. The system of claim 15 wherein the selected controllers are operative to update a process model using forward propagation to simulate the process from the time indicated by the time stamp forward to an apply time, based on the updated process information or a transformed version thereof, the time stamp and one of the distributed apply time or an apply time determined individually by each of the selected controllers.

25. A method for synchronizing control efforts of a plurality of module controllers in a document processing system, the method comprising:
receiving updated sheet processing information in association with a time stamp indicating when the updated sheet processing information was collected;
determining a maximum delay associated with distributing the updated sheet processing information to at least one of the plurality of module controllers;
determining, based on the determined maximum delay, an apply time at which the plurality of module controllers are to react to the updated sheet processing information, and
updating, at each controller of the plurality of module controllers, a sheet process model based on the updated sheet processing information and the determined apply time.

26. The method of claim 25 wherein receiving updated sheet processing information comprises:
receiving at least one of sheet position, sheet velocity and sheet trajectory information from at least one of a first controller of the plurality and a sensor.

27. A document processing system comprising:
a first xerographic marking engine;
a plurality of transport module controllers, each transport module controller of the plurality being operative to control a portion of a sheet transportation task related to transporting a sheet to or from the first xerographic marking engine;
a distributing element that is operative to receive updated process information, select transport module controllers of the plurality to receive the updated process information based on the received updated process information, and distribute the updated process information to the selected transport module controllers in conjunction with at least one of a time stamp indicating when the information was collected and an apply time indicating when the information is to be used.

28. The system of claim 27 further comprising:
at least a second marking engine, wherein the sheet transportation task is further related to transporting the sheet to or from the at least a second marking engine.

* * * * *